Jan. 30, 1945.　　　C. G. HAYES　　　2,368,358
TRAP NEST
Filed May 24, 1943　　2 Sheets-Sheet 1
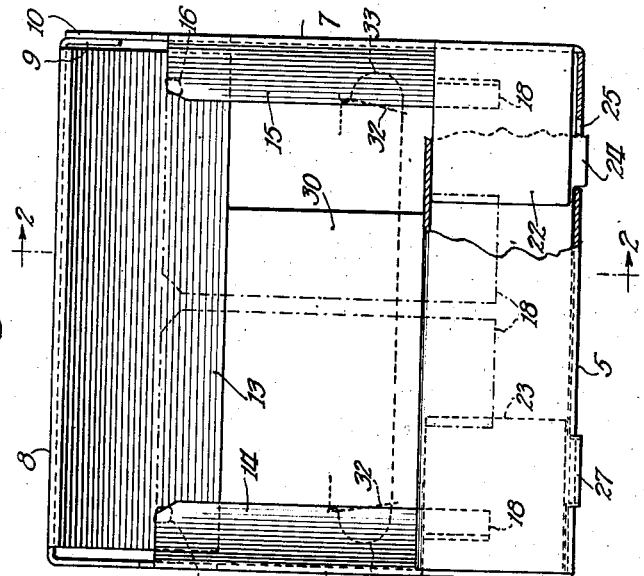
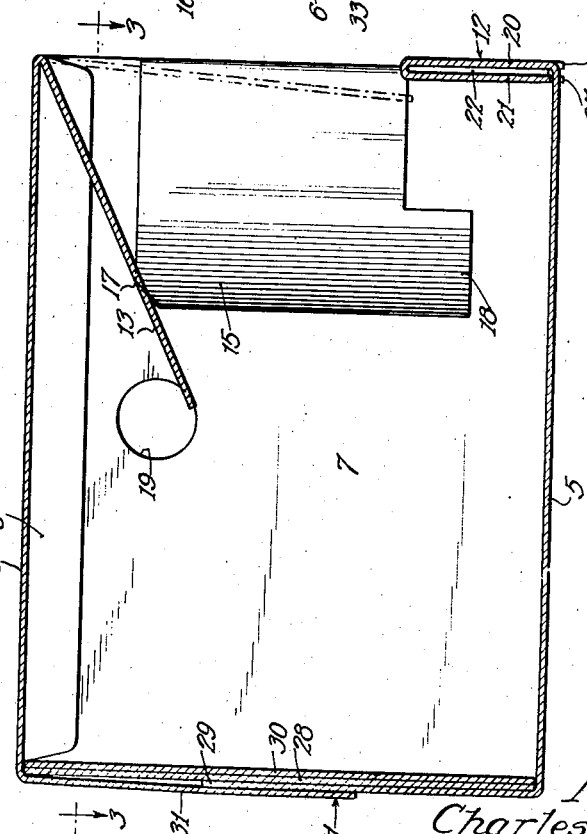
Inventor:
Charles G. Hayes.

Jan. 30, 1945. C. G. HAYES 2,368,358
TRAP NEST
Filed May 24, 1943 2 Sheets-Sheet 2
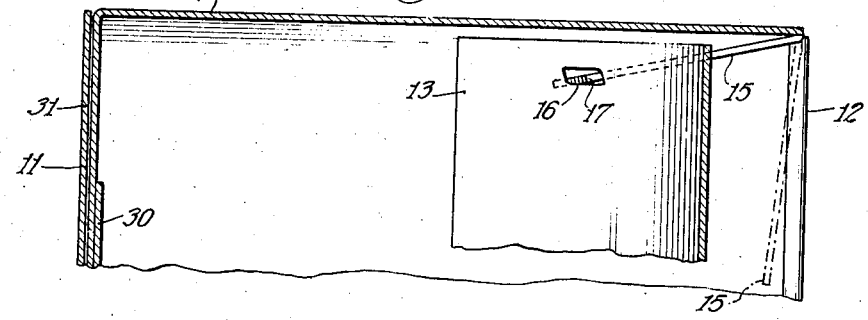
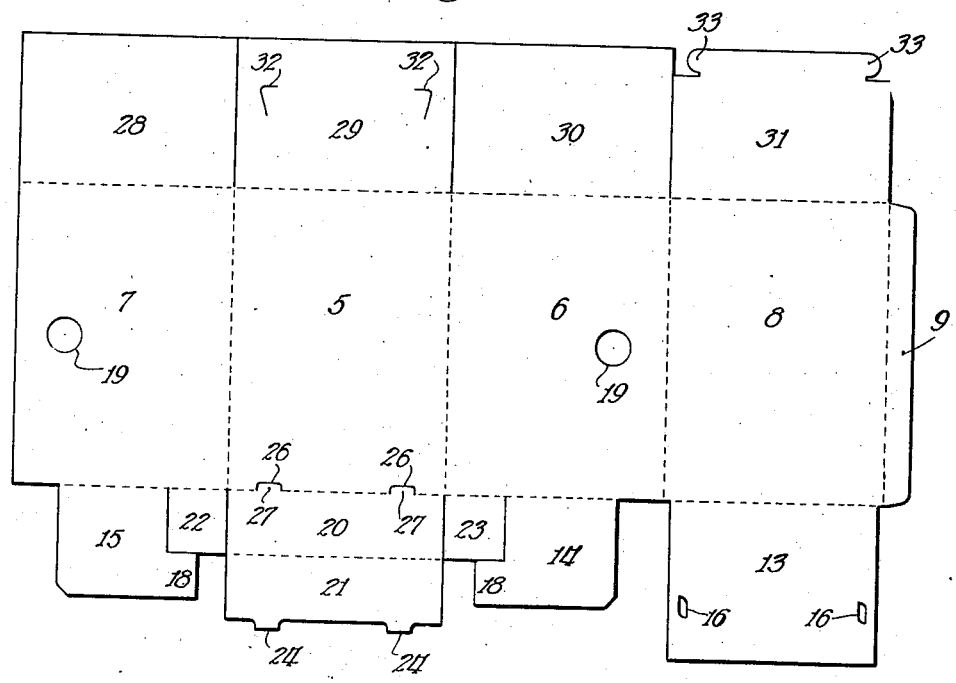
Inventor
Charles G. Hayes.
By Evans, Pond & Anderson Attys Patented Jan. 30, 1945

2,368,358

UNITED STATES PATENT OFFICE 2,368,358

TRAP NEST

Charles G. Hayes, La Grange, Ill., assignor to Chicago Carton Company, a corporation of Delaware Application May 24, 1943, Serial No. 488,120

8 Claims. (Cl. 119—49)

This invention relates to an improvement in an article generally designated "trap nest," and which is most commonly used by poultry men to trap laying hens for the purpose of maintaining a record of the egg production of each hen.

The improvement herein disclosed has to do particularly with the construction of a trap nest of the character indicated of paper board, and the main objects of the invention are to provide a trap nest which may be made economically and at low cost by use of more or less conventional automatic paper box making machinery; to provide a device of the character mentioned which will be simple in construction but efficient and of sufficient durability to make its use practical and efficient; to provide a trap nest which may be made and sold at such low cost that it may be advantageously disposed of as by burning and replaced by a clean, new nest after a limited period of use; and, in general, it is the object of the invention to provide an improved trap nest of the character indicated.

Other objects and advantages of the invention will be understood by reference to the following specification and accompanying drawings (two sheets) wherein there is disclosed the trap nest construction embodying a selected form of the invention.

In the drawings:

Fig. 1 is a front end elevation;

Fig. 2 is a section on the line 2—2 of Fig. 1;

Fig. 3 is a section on the line 3—3 of Fig. 2; and

Fig. 4 is a plan of the blank employed to form the trap nest shown in Figs. 1 to 3 inclusive.

The trap nest herein disclosed embodies a rectangular box-like structure having a bottom wall 5, side walls 6 and 7, and a top wall 8. These walls are made from a continuous paper board member folded to the indicated tubular form, one end of the blank employed for forming the body being provided with a gluing flap 9 which laps and is glued to a marginal portion 10 of the side wall 7. The rear end of the box-like body is closed by suitable end closure flaps which may be locked in closed position in any suitable manner to form the rear end wall 11.

At the front end of the box-like body there is provided a normally stationary or fixed lower wall part 12, a top wall flap 13 and side wall flaps 14 and 15. The top wall flap 13 and the side wall flaps 14 and 15 are foldably connected to the front edges of the top wall 8 and side walls 6 and 7 respectively, and they are adapted to be folded inwardly into the box-like body with the top wall flap 13 overlying the upper edges of the inwardly folded side wall flaps 14 and 15. The top wall flap 13 is provided adjacent its opposite sides with holes, such as indicated at 16, so positioned as to be adapted to receive upper edge corner portions 17 of the respective side wall flaps 14 and 15. When the upper corner portions 17 of the side wall flaps 14 and 15 are received in the holes 16, the top wall flap 13 serves to hold the side wall flaps 14 and 15 in their inwardly folded position against their normal tendency to swing outwardly, such tendency being due to the inherent resiliency of the paper board material of which the device is constructed, and to the normal resistance of the material to the relatively sharp bending effected when the side wall flaps 14 and 15 are folded to the inwardly extending position illustrated.

Each of the side wall flaps 14 and 15 is provided with depending ear portions 18 which are adapted to engage the inside of the front wall portion 12 to limit the outward swinging movement of the members 14 and 15, or, in other words, to position the side wall flaps 14 and 15, when freed from the openings 16, to a position in which the said side wall flaps 14 and 15 (and the top wall flap 13) extend across and close the front end of the nest.

The trap nest may be employed without any bedding in it, and, in any event, the amount of bedding should not be sufficient to cause any interference with the movement of the flaps 14 and 15. The nest is made of such size that when a hen enters the nest she will necessarily raise the top wall flap 13, thereby releasing the side wall flaps 14 and 15, which will thereupon automatically swing or spring to their closed positions, as indicated in broken lines in Fig. 1. Also, as the hen moves around or settles in the nest, the top wall 13 will be permitted to drop down into closed position as shown in broken lines in Fig. 2, thereby overlapping the side wall flaps 14 and 15 on the inside thereof and cooperating therewith to close the front end of the nest to thereby trap the hen in it.

The side walls 6 and 7 may have one or more ventilating openings such as indicated at 19.

The details of construction may be varied considerably from those herein shown. In this instance, the fixed front wall portion 12 is formed by means of a pair of flap portions 20 and 21 integral with but foldably connected to the front end of the bottom wall 5, the flap portion 21 being also integrally and foldably connected to the portion 20. The inner portion 21 is folded into face to face relation to the inside of the portion 20 so as to embrace between the portions 20 and 21, tongue-like flaps 22 and 23 which are folded inwardly from the side walls 7 and 6 respectively. For the purpose of locking the flap portion 21 in the said folded position, it is provided with short tongues or lips 24 which are adapted to project into openings such as indicated at 25 (Fig. 1) which are formed by suitable slits 26 (Fig. 4). The slits 26 are of such shape that when the flap part 20 is folded to upwardly extending position relative to the bottom wall 5, small tongue-like portions 27 (Figs. 1, 2 and 4) of the bottom wall are folded downwardly in continuation of the plane of the flap 20, thereby leaving the indicated openings such as 25 for receiving the tongues 24.

The rear end of the nest may be closed by means of flaps 28, 29, 30 and 31 integrally but foldably connected to the walls of the nest. The flaps 28 and 30 may first be folded inwardly, then the flap 92, and lastly the flap 31. The flap 29 may be provided with slits 32 for receiving ears or tongues 33 formed on the member 31 to lock the flaps in their closed or end wall forming position.

The device may be made of a suitable grade and weight of paper board to provide the required durability and desired spring characteristics in the foldable connections between the front wall forming flaps 13, 14 and 15 and the respective body walls from which they extend. The paper board may be waterproofed or it may be of laminated construction including a waterproof ply, or a waterproof coating internally, externally or intermediate the thickness of the board. One practical embodiment of the structure may be approximately 10" high, 10" wide, and 14" long (from front to back). In the illustrated embodiment, the locking corners 17 of the side wall flaps 14 and 15 are illustrated as being formed at the upper ends of beveled corners, and this is preferred for the reason that such corners are somewhat more durable than relatively sharper corners formed by perpendicular edges. The bevelled locking corners also have a more limited extent of penetration through the locking openings 17 than would sharper corners, and thereby insure operation of the structure even though the top wall flap 13 is raised only slightly.

It will be apparent that the trap nest embodying the principles of the above described structure may be made without necessarily employing the specific details illustrated and described. The scope of the invention should therefore be determined by reference to the following claims.

I claim:

1. A trap nest made of foldable fibrous material such as paper board, having bottom, top, side and end walls forming a box-like body, one of said end walls comprising side wall flaps and a top wall flap foldable into inwardly extending position in the body, means for releasably interlocking said top and side wall flaps in said inwardy extending position and adapted to be disengaged incident to displacement of one of said flaps by a hen entering the nest, the foldable connection between said flaps and the respective walls embodying sufficient resiliency to cause said flaps to swing outwardly to body end closing position when said interlocking means is released as aforesaid.

2. A paper board trap nest comprising top, bottom and side walls forming a tubular body, said walls being foldably connected so as to permit collapsing of the body to flat condition for storage and transportation purposes, flaps extending from the rear ends of said body walls for closing the rear end of the body when in set up position, and flaps extending from the front ends of the top and side walls of the body, foldable into the body and provided with disengageable interlocking means for holding the flaps in said inwardly folded position, said interlocking means being such as to be disengageable incident to engagement of one of said flaps by a hen entering the nest so as to permit said flaps to swing outwardly to front end closing position as an incident to the inherent resiliency of the foldable connection between said flaps and the side and top walls from which they extend.

3. A paper board trap nest comprising top, bottom and side walls forming a tubular body, said walls being foldably connected so as to permit collapsing of the body to flat condition for storage and transportation purposes, flaps extending from the rear ends of said body walls for closing the rear end of the body when in set up position, flaps extending from the front ends of the top and side walls of the body, foldable into the body and provided with disengageable interlocking means for holding the flaps in said inwardly folded position, said interlocking means being such as to be disengageable incident to engagement of one of said flaps by a hen entering the nest so as to permit said flaps to swing outwardly to front end closing position as an incident to the inherent resiliency of the foldable connection between said flaps and the side and top walls from which they extend, and means for limiting outward swinging movement of said front end flaps.

4. A trap nest made of foldable fibrous material such as paper board, having bottom, top, side and end walls forming a box-like body, one of said end walls comprising side wall flaps and a top wall flap foldable into inwardly extending position in the body, means for releasably interlocking said top and side wall flaps in said inwardly extending position and adapted to be disengaged incident to displacement of one of said flaps by a hen entering the nest, the foldable connection between said flaps and the respective walls embodying sufficient resiliency to cause said flaps to swing outwardly to body end closing position when said inter-engaging means is released as aforesaid, said end wall being provided with a fixed portion extending upwardly from the bottom of the nest for limiting said outward swinging movement of said flaps.

5. A trap nest made of foldable fibrous material such as paper board, having bottom, top, side and end walls forming a box-like body, one of said end walls comprising side wall flaps and a top wall flap foldable into inwardly extending position in the body, means for releasably interlocking said top and side wall flaps in said inwardly extending position and adapted to be disengaged incident to displacement of one of said flaps by a hen entering the nest, the foldable connection between said flaps and the respective walls embodying sufficient resiliency to cause said flaps to swing outwardly to body end closing position when said inter-engaging means is released as aforesaid, said end wall being provided with a fixed portion extending upwardly from the bottom of the nest for limiting said outward swinging movement of said flaps, said fixed end wall portion embodying tongues folded inwardly from the opposite side walls of the body, a flap folded upwardly from the bottom wall outwardly of said inwardly folded tongues, and another flap foldably connected to said upwardly folded flap and folded downwardly inwardly of said side wall tongues, and means for locking said downwardly folded flap in folded position to thereby lock said fixed wall portion in operative position.

6. A trap nest made of foldable fibrous material such as paper board, having bottom, top, side and end walls forming a box-like body, one of said end walls comprising side wall flaps and a top wall flap foldable into inwardly extending position in the body means for releasably interlocking said top and side wall flaps in said inwardly extending position and adapted to be disengaged incident to displacement of one of said flaps by a hen entering the nest, the foldable connection between said flaps and the respective walls embodying sufficient resiliency to cause said flaps to swing outwardly to body end closing position when said inter-engaging means is released as aforesaid, and a fixed wall portion extending upwardly from the bottom of the nest only a portion of the height of the body thereof, said side wall flaps having portions extending downwardly below the upper edge of said fixed wall portion and adapted to engage the inside thereof, to thereby limit outward swinging movement of said side wall flaps.

7. A paper board trap nest comprising top, bottom and side walls forming a tubular body, said walls being foldably connected so as to permit collapsing of the body to flat condition for storage and transportation purposes, flaps extending from the rear ends of said body walls for closing the rear end of the body when in set-up position, and flaps extending from the front ends of the top and side walls of the body and foldable into the body, said top wall flap having openings therein adapted to receive upper corner portions of the respective side wall flaps to disengageably lock the flaps in said inwardly folded position, and said locking means being disengageable as an incident to engagement of one of said flaps by a hen entering the nest, whereby said flaps are permitted to swing outwardly to end closing position as an incident to the inherent resiliency of the foldable connections between the flap and the walls from which they extend.

8. A paper board trap nest comprising top, bottom and side walls forming a tubular body, said walls being foldably connected so as to permit collapsing of the body to flat condition for storage and transportation purposes, and a trap door structure at one end of the body comprising flaps extending respectively from the adjacent ends of the top and a side wall of the body, said flaps being foldable into the body and provided with disengageable interlocking means for holding the flaps in said inwardly folded position, said interlocking means being disengageable as an incident to movement of one of said flaps by a hen entering the nest, thereby permitting said flaps to swing outwardly to end closing position, and means for limiting the outward swinging movement of said flaps to said closed position.

CHARLES G. HAYES.